US012626593B2

(12) United States Patent
Zeng

(10) Patent No.: US 12,626,593 B2
(45) Date of Patent: May 12, 2026

(54) IoV BASED PARKING SYSTEM AND PARKING METHOD

(71) Applicant: SHENYANG ONE DRIVE TECHNOLOGY CO., LTD., Shenyang (CN)

(72) Inventor: Qiyun Zeng, Shanghai (CN)

(73) Assignee: SHENYANG ONE DRIVE TECHNOLOGY CO., LTD., Shenyang (CN)

( * ) Notice: Subject to any disclaimer, the term of this patent is extended or adjusted under 35 U.S.C. 154(b) by 51 days.

(21) Appl. No.: 18/710,971

(22) PCT Filed: Dec. 23, 2021

(86) PCT No.: PCT/CN2021/140819
§ 371 (c)(1),
(2) Date: May 16, 2024

(87) PCT Pub. No.: WO2023/087487
PCT Pub. Date: May 25, 2023

(65) Prior Publication Data

US 2025/0336294 A1 Oct. 30, 2025

(30) Foreign Application Priority Data

Nov. 18, 2021 (CN) ........................ 202111374929.7

(51) Int. Cl.
*G08G 1/14* (2006.01)

(52) U.S. Cl.
CPC ............. *G08G 1/148* (2013.01); *G08G 1/144* (2013.01); *G08G 1/146* (2013.01)

(58) Field of Classification Search
None
See application file for complete search history.

(56) References Cited

U.S. PATENT DOCUMENTS

2014/0302875 A1* 10/2014 Beaurepaire ....... G01C 21/3685 455/456.3

FOREIGN PATENT DOCUMENTS

| | | | |
|---|---|---|---|
| CN | 1208302 | A | 2/1999 |
| CN | 103247179 | A | 8/2013 |
| CN | 205541477 | U | 8/2016 |

(Continued)

OTHER PUBLICATIONS

The World Intellectual Property Organization (WIPO) International Search Report for PCT/CN2021/140819 Jul. 27, 2022 6 Pages (including translation).

*Primary Examiner* — John F Mortell
(74) *Attorney, Agent, or Firm* — Anova Law Group, PLLC

(57) ABSTRACT

An Internet of Vehicles (IoV) based parking system includes an information transceiver module configured to communicate with vehicles parked in a target parking area to receive reference departure times sent by the vehicles, and to communicate with a user vehicle to be parked in the target parking area to receive expected departure time sent by the user vehicle; and a planning module configured to compare the expected departure time of the user vehicle to be parked in the target parking area with each of the reference departure times of the vehicles parked in the target parking area, and to plan a parking area for the user vehicle. The present disclosure also provides an IoV based parking method.

16 Claims, 6 Drawing Sheets

(56) References Cited

FOREIGN PATENT DOCUMENTS

| | | | |
|---|---|---|---|
| CN | 107170286 | A | 9/2017 |
| CN | 107862641 | A | 3/2018 |
| CN | 108389426 | A | 8/2018 |
| CN | 108681797 | A | 10/2018 |
| CN | 108737492 | A | 11/2018 |
| CN | 109326139 | A | 2/2019 |
| CN | 110047327 | A | 7/2019 |
| CN | 113392452 | A | 9/2021 |
| KR | 102268381 | B1 | 6/2021 |

* cited by examiner

IoV BASED PARKING SYSTEM AND PARKING METHOD

CROSS-REFERENCE TO RELATED APPLICATIONS

This application is a national phase entry of PCT Patent Application No. PCT/CN2021/140819, filed on Dec. 23, 2021, which claims the priority of Chinese Patent Application No. 202111374929.7, filed on Nov. 18, 2021, the entire contents of all of which are incorporated herein by reference.

TECHNICAL FIELD

The present disclosure relates to the technical field of vehicle parking technology, and more particularly, to a parking system and a parking method based on Internet of Vehicles (IoV).

BACKGROUND

When parking spaces are in short supply, some vehicle owners park their cars in locations that block other vehicles from exiting. Under certain circumstance, a vehicle may temporarily park at a parking position blocking other vehicles, it would be nice to know whether the blocked vehicles need to leave sooner than the blocking vehicle and to avoid blocking any vehicle that will leave sooner.

In addition, in certain informal venues, parking areas are not clearly divided into individual parking spaces, but are generally spaces for parking. For example, in some communities, large spaces are marked for temporary parking of vehicles between buildings. However, vehicles parked in these temporary parking spaces may block other parked vehicles from exiting. Therefore, it is necessary to know departure times of blocked vehicles in advance to avoid blocking these vehicles.

SUMMARY

To solve or at least partially solve the above problems, the present disclosure provides a parking mechanism based on the Internet of Vehicles (IoV), which reasonably arranges parking areas of vehicles by obtaining parking times of all vehicles, to avoid or reduce the subsequent need for the vehicle owner to move the vehicles after parking.

One aspect of the present disclosure provides an Internet of Vehicles (IoV) based parking system. The parking system includes an information transceiver module configured to communicate with vehicles parked in a target parking area to receive reference departure times sent by the vehicles, and to communicate with a user vehicle to be parked in the target parking area to receive expected departure time sent by the user vehicle; and a planning module configured to compare the expected departure time of the user vehicle to be parked in the target parking area with each of the reference departure times of the vehicles parked in the target parking area, and to plan a parking area for the user vehicle.

In some embodiments, the parking system further includes: a storage module configured to store parking area floor plans of the target parking area, the reference departure times of the vehicles parked in the target parking area, and the expected departure time of the user vehicle.

In some embodiments, the planning module is further configured to: based on the parking area floor plans stored in the storage module, divide a road access area next to line-marked parking spaces in the target parking area into spots; calculate a usage weight for each of the spots; and based on the usage weight, determine whether each spot is a non-marked parking space.

In some embodiments, the planning module is further configured to: based on the number of times entry/exit route for each line-marked parking space passes through the corresponding spot, determine the usage weight of each spot, the usage weight of each spot increasing as the number of times the entry/exit route passes through the corresponding spot increases.

In some embodiments, the planning module is further configured to: reduce a recommendation index for recommending the spot as the non-marked parking space as the usage weight of the corresponding spot increases.

In some embodiments, the planning module is further configured to: sort the reference departure times of the vehicles parked in the target parking area; and select spots near the line-marked parking spaces of the parked vehicles whose reference departure times are later than the expected departure time of the user vehicle, and splice/combine the spots whose usage weights are low as the non-marked parking area.

In some embodiments, the information transceiver module is further configured to receive the expected departure time of the user vehicle when the target parking area is a parking lot; and the planning module is further configured to determine whether to recommend a line-marked parking spot or a non-marked spot as the parking area based on a comparison result between an estimated stay time and a time threshold, wherein the estimated stay time is calculated as a difference between the expected departure time and a current time.

In some embodiments, in response to the estimated stay time being greater than the threshold time, the planning module is further configured to determine an unoccupied line-marked parking space as the parking area; and in response to the estimated stay time being smaller than or equal to the threshold time, the planning module is further configured to determine a non-marked parking space as the parking area.

In some embodiments, the planning module is further configured to determine the spot near the parking space of the vehicle whose reference departure time is later than the expected departure time as the non-marked parking space, and recommend the non-marked parking space as the parking area to the user vehicle.

In some embodiments, in response to multiple non-marked parking spaces capable of being determined as the non-marked parking space, the planning module is further configured to recommend the non-marked parking space with the lowest usage weight as the parking area.

In some embodiments, in response to insufficient parking spaces in the target parking lot, the planning module is further configured to compare the expected departure time with reference departure time of each vehicle parked in the target parking area, and recommend the spot near the parking space of the vehicle whose reference departure time is later than the expected departure time as the parking area for the user vehicle.

In some embodiments, the parking system further includes: a control module configured to transfer permission to use a temporary vehicle key, wherein when the information transceiver module receives a request from the parked vehicle blocked by the user vehicle, the control module controls the information transceiver module to send the temporary vehicle key to the blocked parked vehicle.

In some embodiments, the parking system further includes: a control module configured to transfer permission to use a temporary vehicle key to parked vehicle blocked by the user vehicle, wherein when an owner of the blocked parked vehicle uses the temporary vehicle key, the information transceiver module is further configured to send a permission transfer notification to an owner of the user vehicle.

In some embodiments, when the target parking area is an unsupervised parking area, the information transceiver module is further configured to receive the reference departure time of vehicles parked in the unsupervised parking area, which is sent by terminals of the vehicles parked in the unsupervised parking area; and the planning module is further configured to select a spot near a parking space of a vehicle whose reference departure time is later than the expected departure time as the parking area, and send information of related to the parking area to a terminal of the user vehicle.

Another aspect of the present disclosure provides an Internet of Vehicles (IoV) based parking method. The method includes: receiving reference departure times of vehicles parked in a target parking area sent by terminals of the vehicles parked in the target parking area; receiving expected departure time sent by a terminal of a user vehicle to be parked in the target parking area; and comparing the expected departure time of the user vehicle to be parked in the target parking area with each of the reference departure times of the vehicles parked in the target parking area, and plan a parking area for the user vehicle.

Another aspect of the present disclosure provides an electronic device. The electronic device includes: a processor storing a computer program; and a memory coupled with the processor. When being executed by the processor, the computer program implements the disclosed parking method.

BRIEF DESCRIPTION OF THE DRAWINGS

The above-described features and advantages of the present disclosure can be better understood through the detailed description of the embodiments of the present disclosure in conjunction with the accompanying drawings. In the drawings, components are not necessarily drawn to scale, and components with similar related properties or characteristics may have the same or similar reference numerals.

Throughout the drawings and the detailed description, the same reference numbers refer to the same elements, features, and structures. For purposes of clarity and ease of description, the drawings may not be drawn to scale.

DETAILED DESCRIPTION OF THE EMBODIMENTS

Figure 1:
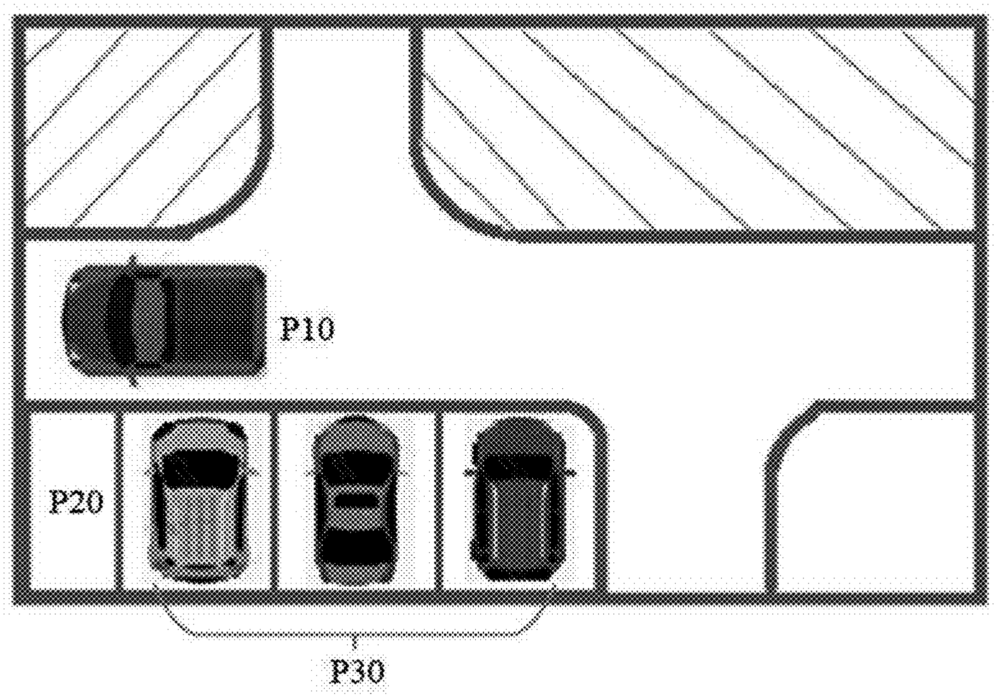
FIG. 1 is a schematic diagram showing a vehicle parked in a temporary parking area blocking other vehicles.

For better comprehension of the present disclosure, various aspects of the present disclosure will be described in more detail with reference to the accompanying drawings. It should be understood that the detailed descriptions are merely descriptions of exemplary embodiments of the present disclosure and are not intended to limit the scope of the present disclosure in any way. Throughout the specification, the term "and/or" includes any and all combinations of one or more of the associated listed items.

In the present disclosure, the order in which each process is described does not necessarily represent an order that these processes are performed in actual operations, unless otherwise stated or limited or can be deduced from the context.

It should also be understood that expressions such as "comprises", "includes", "has", and/or "contains" are open-ended rather than closed-ended expressions in the specification, indicating listed features, elements and/or components without excluding the presence of one or more other features, elements, components and/or combinations thereof. In addition, when an expression such as "at least one of" appears before a recited feature, the expression modifies the entire recited feature rather than individual elements of the recited feature. In addition, when describing the embodiments of the present disclosure, the use of "may" refers to "one or more embodiments of the present disclosure." Moreover, the expression "exemplary" is intended to refer to an example or illustration.

Unless otherwise defined, all terms (including engineering and scientific terms) used herein have the same meaning as commonly understood by one of ordinary skill in the art to which the present disclosure belongs. It should also be understood that, unless explicitly stated in the present disclosure, words defined in commonly used dictionaries should be interpreted to have meanings consistent with their meanings in the context of the relevant technology, and should not be interpreted in an idealized or overly formal interpretation of meaning.

It should be noted that, as long as there is no conflict, the embodiments and features of the embodiments in the present disclosure can be combined with each other.

The parking system referred to in the specification includes but is not limited to an information transceiver module, a positioning module, a planning module, a storage module, a control module, and a display module.

In some embodiments, the information transceiver module includes but is not limited to short-range communication technology, Bluetooth, WIFI, Zigbee communication technology, radio frequency identification (RFID) communication technology, ultra-wideband (UWB) wireless communication technology, 4G mobile communication technology, 5G mobile communication technology, cellular-based narrow band Internet of Things (NB-IOT), long-term evolution (LTE) technology, and IEEE802-based .11P or any one or more of the IEEE 1609 standard protocols to communicate with other vehicles and the external environment. The positioning module may support global navigation satellite system (GNSS), etc. The storage module may include one or more volatile storage (or memory) devices, such as random-access memory (RAM), dynamic RAM (DRAM), synchronous DRAM (SDRAM), static RAM (SRAM), or other types of storage device. The storage module may also include a computer-accessible storage medium (also referred to as a machine-readable storage medium or computer-readable medium) having stored thereon one or more instruction sets or software for implementing one or more systems or methods described herein. The planning module may include, for example (but not limited to) Dijkstra's shortest path algorithm, weight-based allocation algorithm, breadth-first search algorithm, rapid exploration random tree (RTT) algorithm, rolling online RRT algorithm, etc. In addition, the parking system may further include a recognition module to identify objects in the surrounding environment, such as blocked vehicles, parking areas, etc.

Embodiments of the present disclosure will be described below with reference to the accompanying drawings.

FIG. 1 is a schematic diagram showing a vehicle parked in a temporary parking area blocking other vehicles.

For example, as shown in FIG. 1, a first position P10 in a middle-left side of the drawing may be used as a temporary parking area because the vehicle can be easily parked at this position. On the contrary, a second position P20 in a lower-left corner of the drawing cannot be used as a parking area because it is difficult for vehicles approaching from the right to turn in. However, when the vehicle is parked at the first position P10, vehicles parked at a third position P30 in the drawing will inevitably be blocked. If departure times of the blocked vehicles parked at the third position P30 are known to a driver of the vehicle in advance, the driver can decide whether to park the vehicle at the first position P10 or whether to leave a vehicle key based on an expected time of parking the vehicle. A permission to obtain the vehicle key is temporarily transferred to owners of the blocked vehicles parked at the third position P30.

Figure 2:
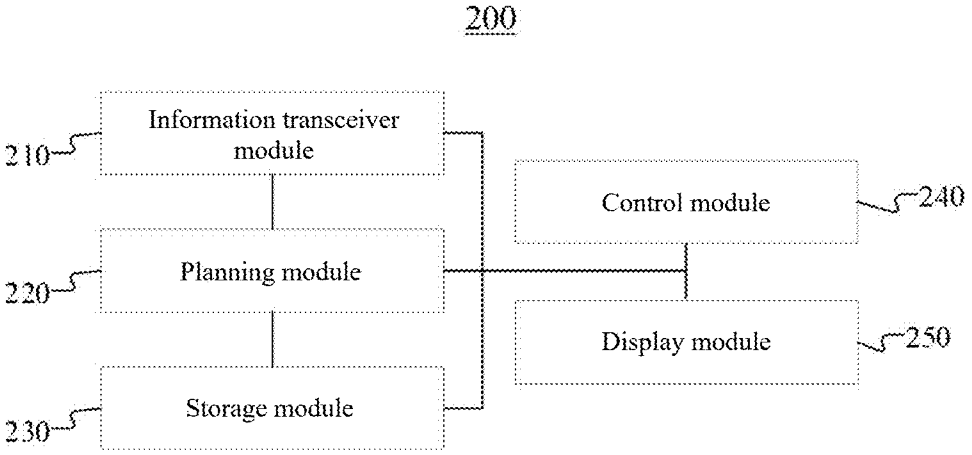
FIG. 2 is a schematic block diagram of an IoV based parking system according to some embodiments of the present disclosure.

FIG. 2 is a schematic block diagram of an IoV based parking system according to some embodiments of the present disclosure. As shown in FIG. 2, the parking system 200 may include, for example (but is not limited to), an information transceiver module 210 configured to communicate with vehicles, a planning module 220 configured to plan suitable parking areas or parking routes for the vehicle, and a storage module 230 configured to store parking area floor plans, information related to vehicle parking time, vehicle identity information, etc.

In some embodiments, the parking system 200 may further include a control module 240 configured to control permission transfer of the vehicle key, and a display module 250 configured to display planned parking areas, notification messages, etc. to the driver of the vehicle.

Figure 3:
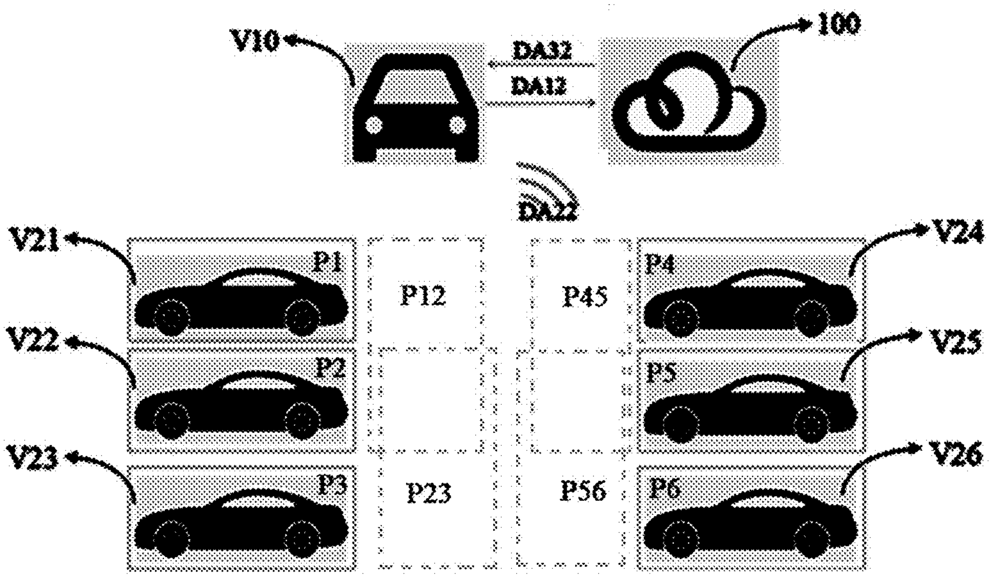
FIG. 3 is a schematic diagram of an application scenario of a parking system according to some embodiments of the present disclosure.
Figure 4:
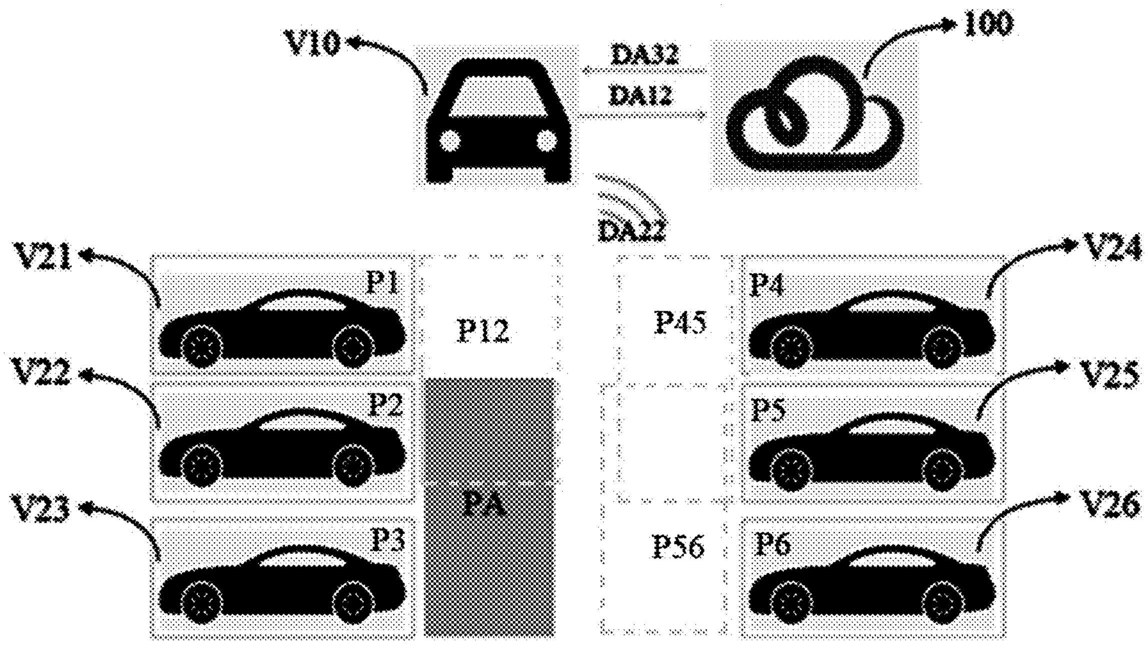
FIG. 4 is a schematic diagram of another application scenario of a parking system according to some embodiments of the present disclosure.

FIG. 3 is a schematic diagram of an application scenario of a parking system 200 according to some embodiments of the present disclosure. FIG. 4 is a schematic diagram of another application scenario of a parking system according to some embodiments of the present disclosure.

As shown in FIG. 3 and FIG. 4, when the user vehicle V10 selects a target parking area to prepare for parking, a terminal device on the user vehicle V10 may send an estimated departure time DA12 of the user vehicle V10 to an Internet of Vehicles (IoV) cloud 100. The IoV cloud 100 obtains reference departure times (or reference stay times) DA22 of the first to sixth parked vehicles V21 to V26 in the target parking area. In some other embodiments, the IoV cloud 100 may obtain the reference departure times DA22 of the first to sixth parked vehicles V21 to V26 when these vehicles are parked, and store the obtained reference departure times DA22 in the storage module 230. After receiving the estimated departure time DA12 sent by the user vehicle V10, the IoV cloud 100 may compare the estimated departure time DA12 of the user vehicle V10 with the reference departure times DA22 of the first to sixth parked vehicles V21 to V26, and may plan a parking area PA for the user vehicle V10 based on comparison results between the reference departure times DA22 and the expected departure time DA12.

In some embodiments, the IoV cloud 100 may plan the parking area PA for the user vehicle V10 through the IoV based parking system 200 shown in FIG. 2. For example, when the user vehicle V10 is ready to park in the target parking area, the terminal device of the user vehicle V10 may send its estimated departure time DA12 (or expected stay time) to the IoV cloud 100 through the information transceiver module 210 of the IoV based parking system 200 shown in FIG. 2. When the IoV cloud 100 receives a parking request of the user vehicle V10 in the target parking area, the IoV cloud 100 may obtain the reference departure times DA22 of the first to sixth parked vehicles V21 to V26 through the information transceiver module 210 of the parking system 200. In some embodiments, the first to sixth parked vehicles V21 to V26 may send their reference departure times DA22 to the IoV cloud 100 through the information transceiver module 210 thereof when parking. The IoV cloud 100 may store the received reference departure times DA22 in the storage module 230. The IoV cloud 100 can use the planning module 220 to compare the expected departure time DA12 of the user vehicle V10 with the reference departure times DA22 of the first to sixth parked vehicles V21 to V26, and plan the parking area PA for the user vehicle based on the comparison results.

As shown in FIG. 3, spots near two line-marked parking spaces may form a temporary parking area. In this case, only when the reference departure times DA22 of the vehicles parked in the two adjacent line-marked parking spaces are later than the expected departure time DA12 of the user vehicle V10, the spots near the two adjacent line-marked parking spaces can be combined to form the temporary parking area. At this time, the planning module 220 may divide the spots near the line-marked parking spaces (i.e., a first line-marked parking space P1 and a second line-marked parking space P2) where a first parked vehicle V21 and a second parked vehicle V22 are located into a first temporary parking area P12. The spots near the line-marked parking spaces (i.e., the second line-marked parking space P2 and a third line-marked parking space P3) where the second parked vehicle V22 and a third parked vehicle V23 are located are divided into a second temporary parking area P23. The spots near the line-marked parking spaces (i.e., a fourth line-marked parking space P4 and a fifth line-marked parking space P5) where a fourth parked vehicle V24 and a fifth parked vehicle V25 are located are divided into a third temporary parking area P45. The spots near the line-marked parking spaces (i.e., the fifth line-marked parking space P5 and a sixth line-marked parking space P6) where the fifth parked vehicle V25 and a sixth parked vehicle V26 are located are divided into a fourth temporary parking area P56.

In some embodiments, as shown in FIG. 3, the information transceiver module 210 receives that the estimated departure time DA12 of the user vehicle V10 is 16:00 PM, and the reference departure times DA22 of the first to sixth parked vehicles V21 to V26 are 14:00 PM, 17:00 PM, 19:00 PM, 18:30 PM, 15:20 PM, and 17:30 PM, respectively. At this time, the planning module 220 may compare each of the reference departure times DA22 of the first to sixth parked vehicles V21 to V26 with the expected departure time DA12 of the user vehicle V10 respectively. Comparison results show that the reference departure times DA22 of the first parked vehicle V21 and the fifth parked vehicle V25 are later than the expected departure time DA12 of the user vehicle V10. Therefore, the temporary parking area including the spot near the first line-marked parking space P1 and the spot near the fifth line-marked parking space P5 can be excluded. As such, only the second temporary parking area P23 including the spot near the second line-marked parking space P2 and the spot near the third line-marked parking space P3 can be planned as the parking area PA, for example, as shown in FIG. 4. The IoV cloud 100 may recommend planning information DA32 including the parking area PA to the user vehicle V10 through the information transceiver module 210.

Figure 5:
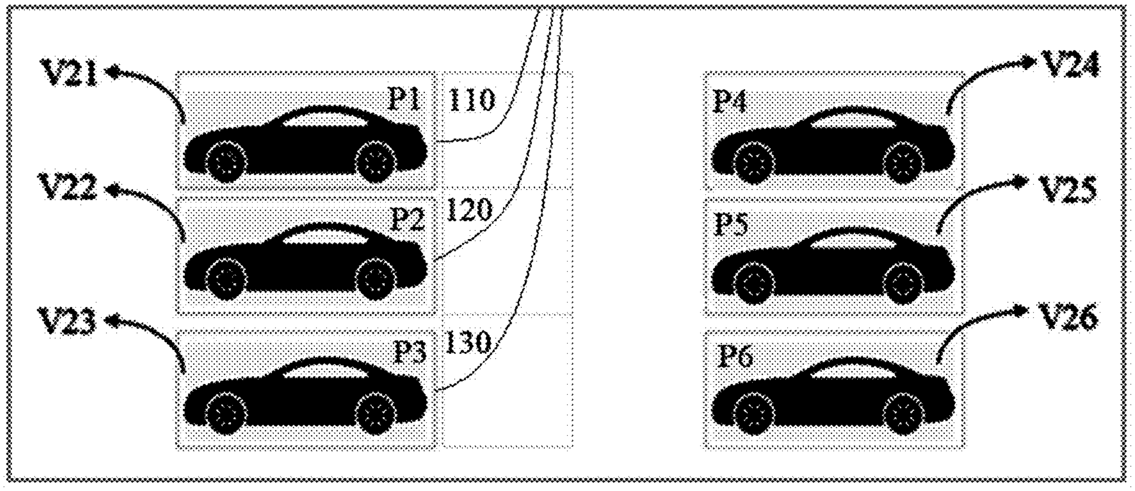
FIG. 5 is a schematic diagram of spots suitable for temporary parking according to some embodiments of the present disclosure.

In some other embodiments, the reference departure times DA22 of the first to sixth parked vehicles V21 to V26 are all later than the expected departure time DA12 of the user vehicle V10. In this case, the first to fourth temporary parking areas P12 to P56 can theoretically be planned as the parking area PA. The planning module 220 may divide a road access area next to the line-marked space in the target parking area into multiple spots according to a floor plan of the target parking area stored by the storage module 230, and may calculate a usage weight for each of the spots. The usage weight of each spot may be determined based on the number of times the entry/exit route for each line-marked parking space passes through the corresponding spot. The usage weight of each spot may increase as the number of times the entry/exit route passes through that spot increases. To block the exit of the parked vehicle as little as possible, it is desired to recommend the spot with a lower usage weight as the parking area PA to the user vehicle V10. Therefore, a recommendation index for recommending the spot as the parking area PA may be reduced as the usage weight of the corresponding spot increases. As shown in FIG. 5, the entry/exit routes of the first line-marked parking space P1, the second line-marked parking space P2, and the third line-marked parking space P3 all pass through the first spot 110. The entry/departure routes of the second line-marked parking space P2 and the third line-marked parking space P3 all pass through the second spot 120. The entry/departure route of the third line-marked parking space P3 passes through only the third spot 130. Therefore, it can be determined that the first spot 110 has the highest usage weight and the third spot 130 has the lowest usage weight. When receiving the parking request of the user vehicle V10, the planning module 220 may sort the usage weights of the first spot 110, the second spot 120, and the third spot 130, and may combine two adjacent spots with the lower usage weights to form the temporary parking area. In some embodiments, an area including the second spot 120 and the third spot 130 may be recommended to the user vehicle V10 as the parking area PA.

When the target parking area is a standard parking lot and there are sufficient parking spaces in the parking lot, the parking area may be divided into different areas. For example, the parking area may be divided into a long-term parking area, a medium-term parking area, and a short-term parking area based on their respective reference stay times. The reference stay time is calculated by a difference between the reference departure time DA22 and the current time. For example, the line-marked parking spaces near the spots with the low usage weights may be divided into the long-term parking area, and the line-marked parking spaces near the spots with the high usage weights may be divided into the short-term parking area. When the reference stay time of the user vehicle exceeds a first threshold, the long-term parking area is planned for the user vehicle. When the reference stay time of the user vehicle is less than a second threshold (the first threshold is greater than the second threshold), the short-term parking area is planned for the user vehicle. Therefore, when there are insufficient line-marked parking spaces in the parking lot, because the spots near the long-term parking area have the low usage weights, the spots may be spliced/combined into non-marked parking spaces for temporary parking.

In some other embodiments, when the expected stay time of the user vehicle V10 received by the IoV cloud 100 is less than a third threshold (the third threshold is less than the second threshold), it can be determined that the user vehicle V10 is only temporarily parked. The expected stay time may be calculated by a difference between the estimated departure time DA12 and the current time. Therefore, even if there are sufficient parking spaces in the parking area, without blocking the parked vehicles, non-marked parking spaces near the line-marked parking spaces may be recommended for the user vehicle V10 to save time.

When the target parking area is a standard parking lot but there are insufficient parking spaces in the parking lot, the IoV cloud 100 may use the planning module 220 to compare the expected departure time DA12 of the user vehicle V10 with the reference departure times DA22 of the vehicles parked in the parking lot. The spot near the parking space of the parked vehicle whose reference departure time DA22 is later than the expected departure time DA12 is planned as the parking area PA. The information transceiver module 210 may recommend the planned parking area PA to the user vehicle V10, for example (but not limited to), through the display module 250.

When the target parking area is an unsupervised non-standard parking area (such as a roadside, a community open space, etc.), the IoV cloud 100 may receive the parking information of the vehicle parked in the non-standard parking area from the terminal of the parked vehicle through the information transceiver module 210. The reference departure time DA22 of the parked vehicle is stored in the storage module 230. The planning module 220 may select a spot near the parking space of the parked vehicle where the stored reference departure time DA22 is later than the expected departure time DA12 of the user vehicle V10 as the parking area PA, and may use the information transceiver module 210 to send information related to the parking area PA to the terminal of the user vehicle V10. In some other embodiments, the parked vehicle may also upload its reference departure time DA22 through its vehicle terminal and store the reference departure time DA22 in the vehicle terminal. When the IoV cloud 100 receives the parking request of the user vehicle V10, the IoV cloud 100 may request the reference departure time DA22 stored therein from the vehicle terminal of the parked vehicle.

In some embodiments, after the planning module 220 plans the parking area PA for the user vehicle V10, for example (but not limited to), a voice navigation system or a head-up display (HUD) system may be used to provide the user vehicle V10 with a parking route from the location of the user vehicle V10 to the parking area. For example, the planning module 220 may estimate a reference departure route of the parked vehicle through the obtained reference departure time DA22 of the parked vehicle, and may consider the reference departure time DA22 and the reference departure route of the parked vehicle when planning the parking route to avoid sharing a same lane with other vehicles leaving the parking area while parking.

In some embodiments, when the user vehicle V10 deviates from the parking route, the planning module 220 re-plans another parking route to the parking area PA for the user vehicle V10. When there is only one route to the parking area PA and the parking route may block the departure route of the parked vehicle that is about to leave, the voice navigation system may send a reminder to the user vehicle V10. Alternatively, when the planning module 220 recognizes that the parking route leading to the parking area PA may block other vehicles from leaving, the HUD system may also be used to display possible parking locations for the driver of the user vehicle V10. In response to prompts from the voice navigation system or the HUD system, the user vehicle may change its parking route in advance to avoid blocking other vehicles.

In some embodiments, a panoramic view of the parking route leading to the parking area PA may be displayed through the HUD system. Where possible, the driver of the user vehicle V10 may also autonomously plan the parking route based on the displayed panorama.

In some embodiments, when the parked vehicle recognizes that the user vehicle V10 is about to park at the exit of the parked vehicle, a reminder may be sent to the user vehicle V10.

Figure 6:
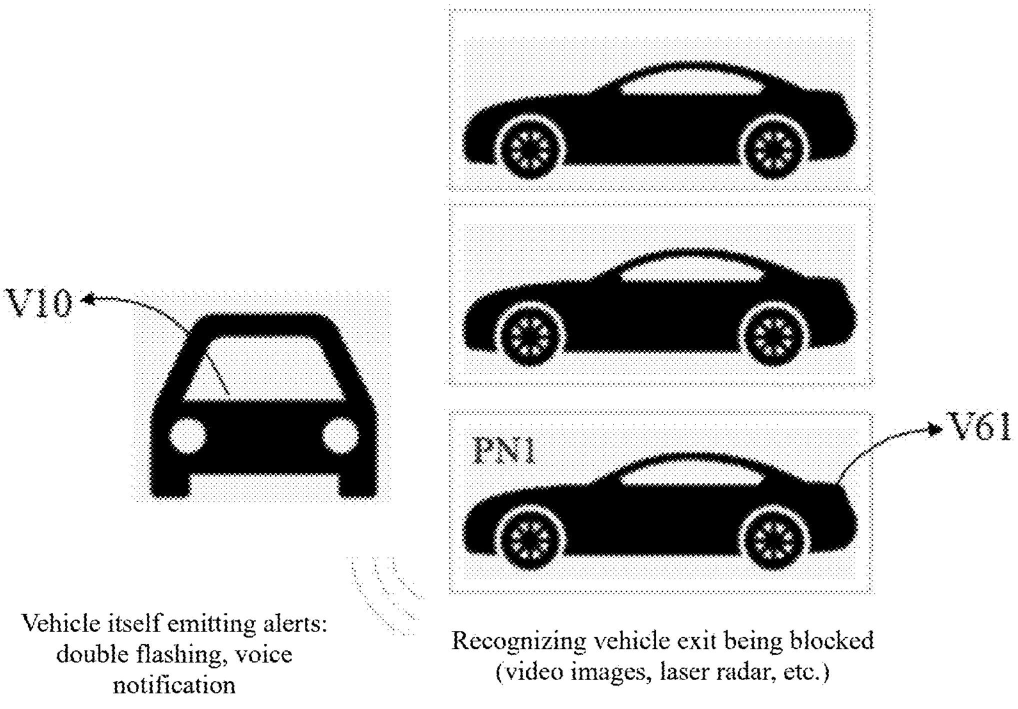
FIG. 6 is a schematic diagram showing an application scenario of a vehicle approaching to block parked vehicles according to some embodiments of the present disclosure.

For example, as shown in FIG. 6, the vehicle V61 temporarily parked in a first non-marked area PN1 is about to leave in about 10 minutes. When the user vehicle V10 is about to park near the first non-marked area PN1, the temporarily parked vehicle V61 may recognize that its departure route is occupied through a laser radar, video images, etc. For example, the temporarily parked vehicle V61 may recognize the license plate number of the user vehicle V10, and may send a temporary parking message and its own reference departure time DA22 to the user vehicle V10 through the IoV cloud 100 to remind the user vehicle V10 not to block its own exit. Alternatively, the temporarily parked vehicle V61 may also send out a reminder through itself when it recognizes that the user vehicle V10 is about to occupy its departure route. For example, the reminder may be voice prompts, double flashing of head lights, projected text, etc.

For example, the temporarily parked vehicle V61 may communicate with the user vehicle V10 through a parking system 200. For example, the temporarily parked vehicle V61 may send its reference departure time DA22 to the user vehicle V10 through the information transceiver module 210. The user vehicle V10 may receive the reference departure time DA22 sent by the temporarily parked vehicle V61 through the information transceiver module 210, and may decide whether to park the vehicle at this location.

Figure 7:
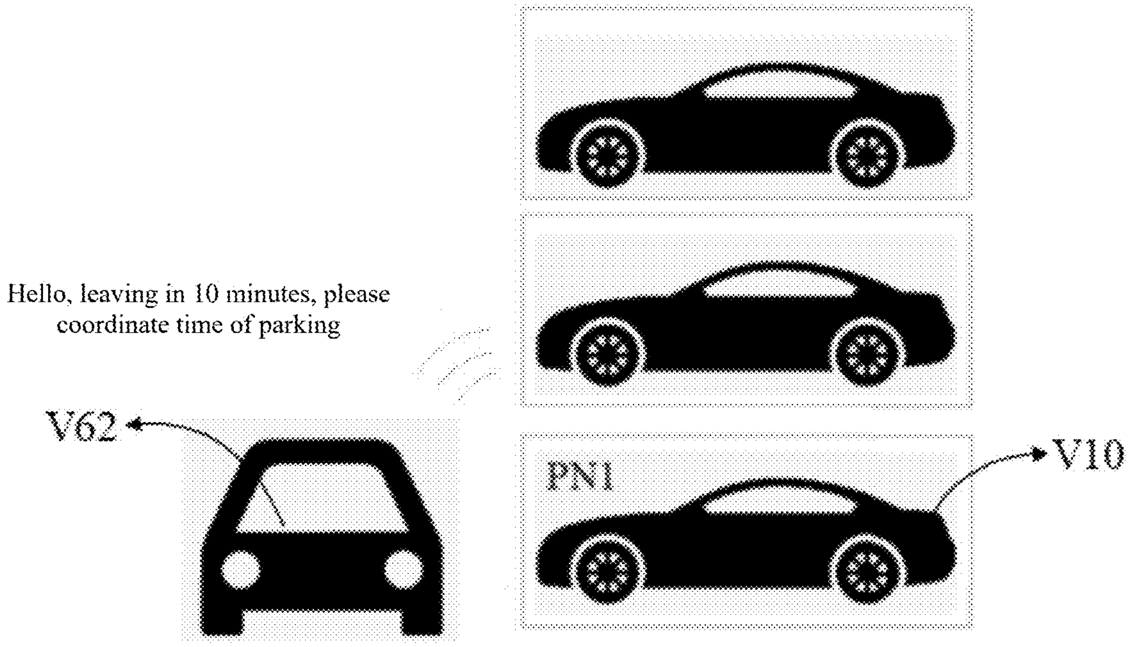
FIG. 7 is a schematic diagram showing an application scenario of a vehicle blocking parked vehicles according to some embodiments of the present disclosure.

In some embodiments, as shown in FIG. 7, when the user vehicle V10 is blocked by another temporarily parked vehicle V62, the user vehicle V10 may send text messages/calls to the owner of the temporarily parked vehicle V62 through the vehicle computer system of the user vehicle V10. For example, before the departure time, the vehicle computer system/IoV cloud 100 of the user vehicle V10 sends a notification to the vehicle computer system of the temporarily parked vehicle V62, and then the vehicle computer system of the temporarily parked vehicle V62 sends a text message/phone call (the car system is equipped with a SIM card): "Your car is blocking another vehicle from exiting. The other vehicle will exit in about 10 minutes. Please arrange to move the vehicle as soon as possible!"

If the notification is successful, the vehicle computer system/IoV cloud 100 of the user vehicle V10 is able to notify its owner: "There are other vehicles in front of your vehicle. The other vehicles have been notified to move. Please wait for another 10 minutes." In some other embodiments, when the temporarily parked vehicle V62 blocks the user vehicle V10, after notifying the owner of the temporarily parked vehicle V62, a temporary permission transfer option is also provided: "If your vehicle blocks other vehicles from entering, the other vehicles may be arranged to move as soon as possible after 10 minutes. Do you need to hand over a temporary vehicle key to the other party/parking attendant?"

Note that when a user has permission to use the temporary vehicle key, a driving recorder and an in-vehicle camera may be turned on at the same time, and driving status and in-vehicle status of other the temporarily parked vehicle V62 may be uploaded to the owner of the temporarily parked vehicle in real time to ensure safety of the temporarily parked vehicle V62 safety.

When the owner of the temporarily parked vehicle V62 allows to transfer the temporary vehicle key, the control module 240 may control the information transceiver module 210 to issue the temporary vehicle key to the owner/parking attendant of the user vehicle V10, or issue an automatic parking permission to the user vehicle V10 for the driver of the user vehicle V10 to move the temporarily parked vehicle V62. For example, the parking permission may be set to: only drive within a 500 m range, the upper speed limit is 10 km/h, the usage time is 15 min, etc. The results will be sent back to inform the owner of the temporarily parked vehicle V62.

In some embodiments, other temporarily parked vehicles V62 may also pre-set the permissions to use the temporary vehicle keys by the owner/parking attendant of the blocked vehicle. When other temporarily parked vehicles V62 recognize the license plate number and other information of the vehicle they are blocking (e.g., the user vehicle V10), the permissions to use the temporary vehicle keys are automatically issued to the owner/parking attendant of the user vehicle V10. When the owner/parking attendant of the user vehicle V10 uses the temporary vehicle key, the information transceiver module 210 may send a permission transfer notification to an owner of corresponding temporarily parked vehicle V62.

It should be understood that the terms "temporarily parked vehicle", "parked vehicle" and "user vehicle" used herein are merely for convenience and clarity of description, and not for restrictive purposes. Where appropriate, these terms may be used interchangeably without affecting the scope of the present disclosure.

For example, in the description of FIG. 7, other temporarily parked vehicles V62 may be exchanged with the user vehicle V10, which will not affect the scope of the present disclosure. Although not shown in the drawing, for example, when the user vehicle V10 blocks other temporarily parked vehicles V62, the owner of the user vehicle V10 may allow the permission to use the temporary vehicle key to be transferred, and the control module 240 may control the information transceiver module 210 to transfer the permission to use the temporary vehicle key or the automatic parking permission of the vehicle to the owner/parking attendant of other temporarily parked vehicles for assistance of moving the vehicle. Alternatively, the user vehicle V10 may also pre-set the permission to use the temporary vehicle key for the owner/parking attendant of the blocked vehicle. When the user vehicle V10 recognizes the license plate number and other information of the vehicle it blocks (e.g., other temporarily parked vehicles V62), the permission to use the temporary vehicle key is automatically issued to the owner/parking attendant of other temporarily parked vehicles V62. When other owner/parking attendant of other temporarily parked vehicles V62 use the temporary vehicle key, the information transceiver module 210 may send the permission transfer notification to the owner of the user vehicle V10.

Figure 8:
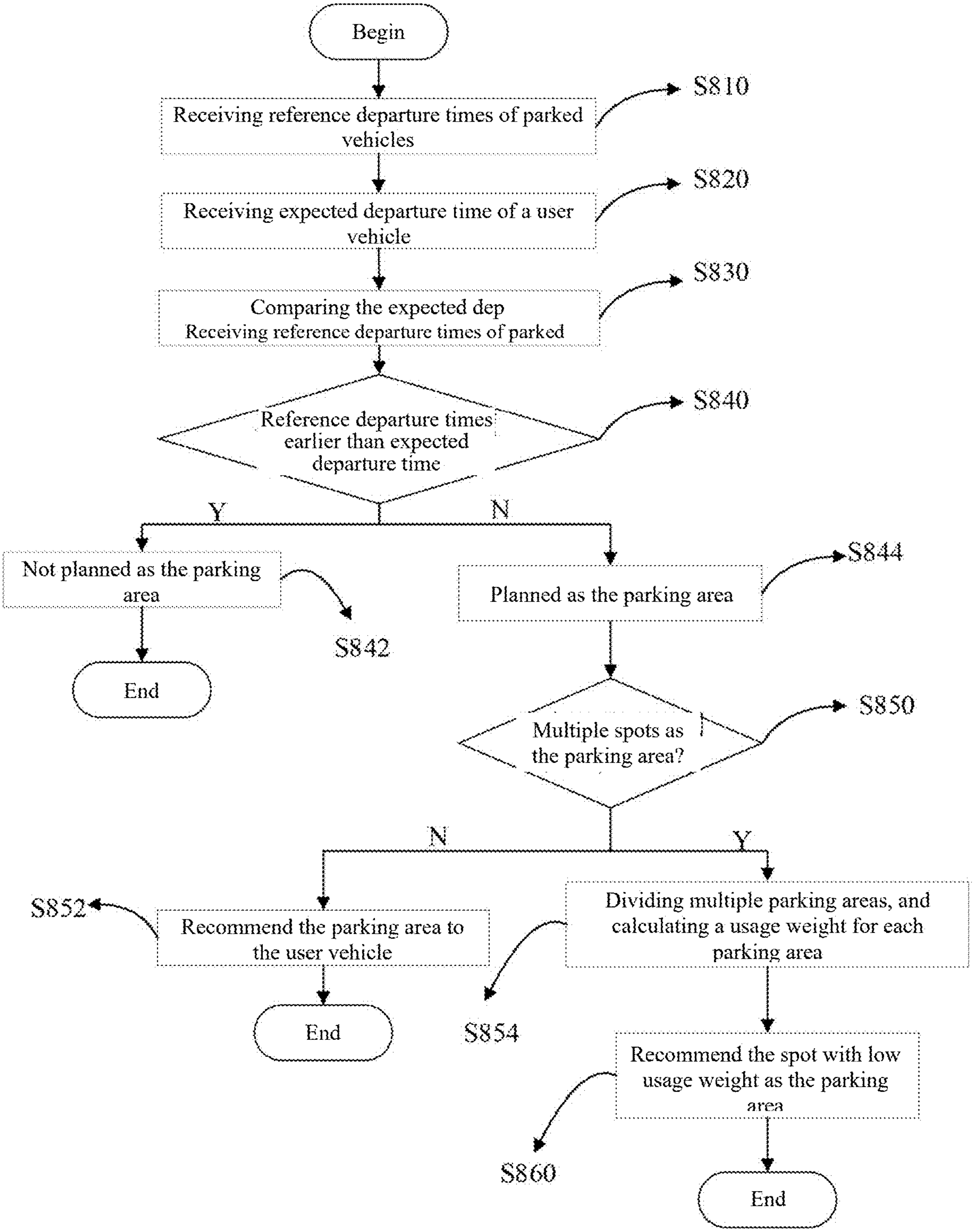
FIG. 8 is a flowchart of an IoV based parking method according to some embodiments of the present disclosure.

FIG. 8 is a flowchart of an IoV based parking method 800 according to some embodiments of the present disclosure. As shown in FIG. 8, the method includes the following processes.

At S810, when the vehicle is parked in the target parking area, the reference departure time DA22 of the parked vehicle is received.

At S820, when the user vehicle V10 issues a parking request for the target parking area, the expected departure time DA12 of the user vehicle V10 is received.

At S830, the reference departure time DA22 of the parked vehicle is compared with the expected departure time DA12 of the user vehicle V10, and the parking area PA is planned for the user vehicle V10 based on the comparison result.

At S840, it is determined whether the reference departure time DA22 of the parked vehicle is earlier than the expected departure time DA12 of the user vehicle V10. If so, S842 is executed. Conversely, if the reference departure time DA22 of the parked vehicle is later than the expected departure time DA12 of the user vehicle V10, S844 is executed.

At S842, it is determined that the spot near the parked vehicle cannot be planned as the parking area PA.

At S844, it is determined that the spot near the parked vehicle can be planned as the parking area PA.

In some embodiments, the number of the parking areas PA determined at S844 may be one or more, and the method 800 may further include additional processes S850 to S860.

At S850, it is determined whether multiple parking areas PA can be planned. If only one parking area PA can be planned, S852 is executed. If two or more parking areas PA can be planned, S854 is executed.

At S852, the parking area PA is planned and recommended to the user vehicle V10.

At S854, the two or more parking areas are divided, and the usage weight of each parking area is calculated.

The usage weight of each line-marked parking space can be determined based on the number of times the entry/departure route passes through each parking area, and the usage weight of the parking area increases as the number of times the entry/departure route passes through each parking area increases.

At S860, after the usage weight of each parking area is calculated, one or more parking areas with low usage weights can be spliced/combined into one parking area PA and recommended to the user vehicle V10.

In the embodiments of the present disclosure, it is possible to avoid the situation where one's own vehicle is blocked by other vehicles or the situation where one's own vehicle blocks other vehicles, and the owners of the other vehicles may be reminded in time when their vehicles are about to be blocked.

In addition, when there is no place to park, if the vehicle owner is in a hurry, the vehicle owner may use the parking system disclosed in the present disclosure to find some temporary parking locations without worrying about blocking the departure of the other vehicles.

When the vehicle only needs to stay for a short period of time, the owner of the vehicle may be recommended to park the vehicle in a non-marked parking space, thereby saving line-marked parking spaces for the vehicles that need to park for a long period of time.

In addition, the parking system provided by the embodiment of the present disclosure can also avoid subsequent situations where the vehicle owner needs to move the vehicle after parking.

Figure 9:
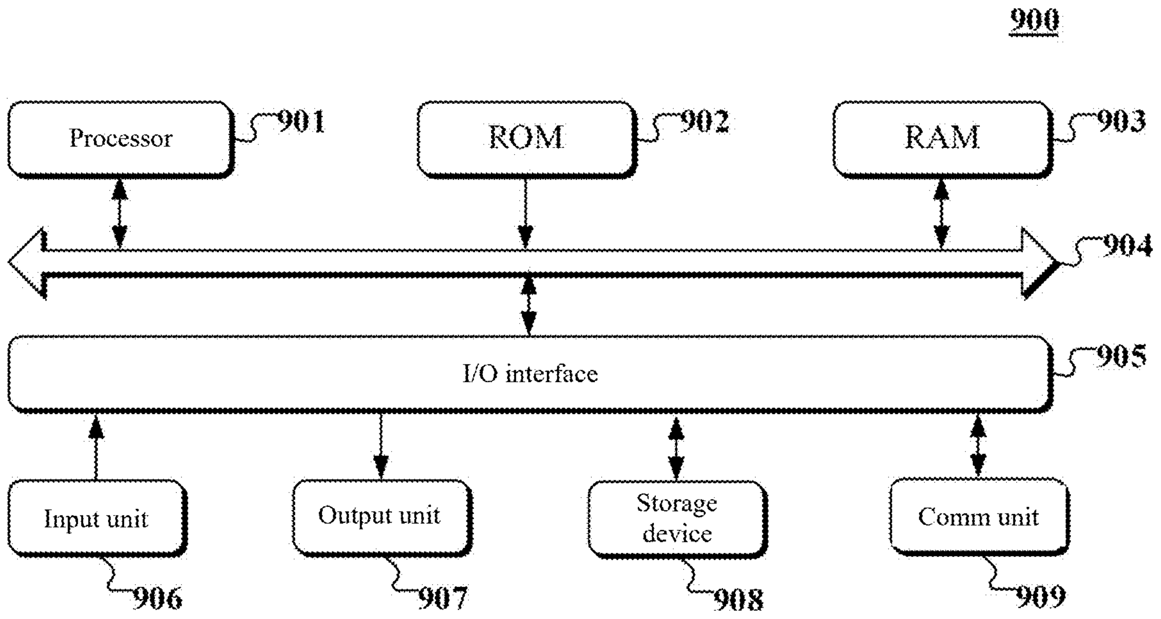
FIG. 9 is a block diagram of an electronic device for performing an IoV based parking method according to some embodiments of the present disclosure.

FIG. 9 is a block diagram of an electronic device 900 for performing an IoV based parking method according to some embodiments of the present disclosure. The electronic device 900 may be various forms of digital computers, such as laptop computers, desktop computers, workstations, personal digital assistants, servers, blade servers, mainframe computers, and other suitable computers. The electronic device 900 may also represent various forms of mobile devices, such as personal digital assistants, cellular phones, smart phones, wearable devices, and other similar computing devices. The components shown herein, their connections and relationships, and their functions are merely exemplary and are not intended to limit the scope of the present disclosure as described and/or claimed herein.

As shown in FIG. 9, the electronic device 900 includes a processor 901, a read-only memory (ROM) 902, a random-access memory (RAM) 903, an input/output (I/O) interface 905, and a storage device 908. The processor 901 is configured to execute various tasks such as appropriate actions and handling according to a computer program stored in ROM 902 or loaded from the storage device 908 into RAM 903. Various programs and data required for the operation of the electronic device 900 may also be stored in RAM 903. The processor 901, ROM 902, and RAM 903 are connected to each other through a bus 904. The I/O interface 905 is also connected to bus 904.

Multiple components in the device 900 that are connected to the I/O interface 905 include: an input unit 906, such as a keyboard, mouse, etc.; an output unit 907, such as various types of displays, speakers, etc.; the storage device 908, such as a magnetic disk, optical disk, etc.; and a communication unit 909, such as a network card, modem, wireless communication transceiver, etc. The communication unit 909 allows the electronic device 900 to exchange information/data with other devices through computer networks such as the Internet and/or various telecommunications networks.

The processor 901 may be a variety of general and/or special purpose processing components having processing and computing capabilities. Some examples of the processor 901 include, but are not limited to, a central processing unit (CPU), a graphics processing unit (GPU), various dedicated artificial intelligence (AI) computing chips, various processors running machine learning model algorithms, various digital signal processing processors (DSP), and any appropriate processors, controllers, microcontrollers, etc. The processor 901 performs various methods and processes described above, such as methods for parking vehicles. For example, in some embodiments, a parking method may be implemented as a computer software program that is tangibly embodied in a machine-readable storage medium, such as the storage device 908. In some embodiments, part or all of the computer program may be loaded and/or installed onto the electronic device 900 via ROM 902 and/or the communication unit 909. When the computer program is loaded into RAM 903 and executed by the processor 901, one or more processes of the parking method described above may be performed. Alternatively, in some other embodiments, the processor 901 may be configured to perform the parking method in any other suitable manner (e.g., by means of firmware).

Various implementations of the methods and systems described above may be implemented in digital electronic circuit systems, integrated circuit systems, field programmable gate arrays (FPGAs), application specific integrated circuits (ASICs), application specific standard products (ASSPs), systems on a chip implemented in a system (SOC), load programmable logic device (CPLD), computer hardware, firmware, software, and/or a combination thereof. These various embodiments may include implementation in one or more computer programs executable and/or interpreted on a programmable system including at least one programmable processor. The programmable processor may be a special purpose or general purpose programmable processor, may receive data and instructions from a storage system, at least one input device, and at least one output device, and transmit data and instructions to the storage system, the at least one input device, and the at least one output device.

Program codes for implementing the methods of the present disclosure may be written in any combination of one or more programming languages. The program codes may be packaged into a computer program product. These program codes or computer program products may be provided to a processor or controller of a general-purpose computer, special-purpose computer, or other programmable data processing device, such that the program codes, when executed by the processor 901, cause functions/operations specified in the flowcharts and/or block diagrams to be implemented. The program codes may be executed entirely on the machine, partly on the machine, as a stand-alone software package, partly on the machine and partly on a remote machine or entirely on the remote machine or server.

In the specification of the present disclosure, the machine-readable storage medium may be a tangible medium that contains or stores a program for use by or in connection with an instruction execution system, apparatus, or device. The machine-readable storage medium may be a machine-readable signal storage medium. The machine-readable storage medium may include, but are not limited to, electronic, magnetic, optical, electromagnetic, infrared, or semiconductor systems, devices, or any suitable combination thereof. More specific examples of machine-readable storage medium would include electrical connections based on one or more wires, laptop disks, hard drives, random access memory (RAM), read only memory (ROM), erasable programmable read only memory (EPROM or flash memory), optical fiber, portable compact disk read-only memory (CD-ROM), optical storage device, magnetic storage device, or any suitable combination thereof.

To provide interaction with a user, the methods and systems described herein may be implemented on a computer including: a display device (e.g., a cathode ray tube or a liquid crystal display monitor) for displaying information to the user; and a keyboard and pointing device (e.g., a mouse or a trackball) through which a user can provide input to the computer. Other kinds of devices may also be included to provide interaction with the user. For example, the feedback provided to the user may be any form of sensory feedback (e.g., visual feedback, auditory feedback, or tactile feedback); and may be provided in any form, including acoustic input, speech input, or tactile input to receive input from the user.

The methods and systems described herein may be implemented in a computing system that includes back-end components (e.g., as a data server), or a computing system that includes middleware components (e.g., an application server), or a computing system that includes front-end components (e.g., a user's computer having a graphical user interface or web browser through which the user can interact with implementations of the systems and technologies described herein), or including such backend components, middleware components, or any combination of front-end components in a computing system. The components of the system may be interconnected by any form or medium of digital data communication (e.g., a communications network). Examples of communication networks include: local area network (LAN), wide area network (WAN), and the Internet.

Computer systems may include clients and servers. The clients and servers are generally remote from each other and typically interact over a communications network. The relationship of the clients and servers is created by computer programs running on corresponding computers and having a client-server relationship with each other. The server may be a cloud server, also known as cloud computing server or cloud host. It is a host product in the cloud computing service system to solve the problem of defects such as difficult management and weak business scalability in the traditional physical host and virtual private server (VPS). The server may also be a distributed system server or a server combined with a blockchain.

It should be understood that various forms of the processes shown above may be used, reordered, added or deleted. For example, each process described in the present disclosure may be executed in parallel, sequentially, or in a different order. As long as the desired results of the technical solution of the present disclosure can be achieved, there is no limitation herein.

The previous description is provided to enable any person skilled in the art to practice the various aspects described herein. However, it should be understood that the protection scope of the present disclosure should be subject to the appended claims, and should not be limited to the specific structures and components of the embodiments explained above. Those skilled in the art can make various changes and modifications to each embodiment within the spirit and scope of the present disclosure, and these changes and modifications also fall within the protection scope of the present disclosure.

What is claimed is:

1. An Internet of Vehicles (IoV) based parking system, comprising:

a processor storing a computer program; and a memory coupled with the processor, wherein when being executed by the processor, the computer program causes the processor to:

communicate with vehicles parked in a target parking area to receive reference departure times sent by the vehicles, and to communicate with a user vehicle to be parked in the target parking area to receive expected departure time sent by the user vehicle;

store in a storage device parking area floor plans of the target parking area, the reference departure times of the vehicles parked in the target parking area, and the expected departure time of the user vehicle;

based on the parking area floor plans stored in the storage device, divide a road access area next to line-marked parking spaces in the target parking area into spots; calculate a usage weight for each of the spots;

based on the usage weight, determine whether each spot is a non-marked parking space; and compare the expected departure time of the user vehicle to be parked in the target parking area with each of the reference departure times of the vehicles parked in the target parking area, and determine a parking space among the line-marked parking spaces and the non-marked parking spaces in the target parking area for the user vehicle.

2. The parking system according to claim 1, wherein the processor is further configured to:

based on the number of times entry/exit route for each line-marked parking space passes through the corresponding spot, determine the usage weight of each spot, the usage weight of each spot increasing as the number of times the entry/exit route passes through the corresponding spot increases.

3. The parking system according to claim 2, wherein the processor is further configured to:

reduce a recommendation index for recommending the spot as the non-marked parking space as the usage weight of the corresponding spot increases.

4. An Internet of Vehicles (IoV) based parking method, comprising:

receiving reference departure times of vehicles parked in a target parking area sent by terminals of the vehicles parked in the target parking area;

receiving expected departure time sent by a terminal of a user vehicle to be parked in the target parking area;

storing in a storage device parking area floor plans of the target parking area, the reference departure times of the vehicles parked in the target parking area, and the expected departure time of the user vehicle;

based on the parking area floor plans stored in the storage device, dividing a road access area next to line-marked parking spaces in the target parking area into spots;

calculating a usage weight for each of the spots:

based on the usage weight, determining whether each spot is a non-marked parking space; and comparing the expected departure time of the user vehicle to be parked in the target parking area with each of the reference departure times of the vehicles parked in the target parking area, and determining a parking space among the line-marked parking spaces and the non-marked parking spaces in the target parking area for the user vehicle.

5. The parking method according to claim 4, wherein calculating the usage weight of each spot comprises:

based on the number of times entry/exit route for each line-marked parking space passes through the corresponding spot, determining the usage weight of each spot, the usage weight of each spot increasing as the number of times the entry/exit route passes through the corresponding spot increases.

6. The parking method according to claim 5, further comprising:

reducing a recommendation index for recommending the spot as the non-marked parking space as the usage weight of the corresponding spot increases.

7. The parking method according to claim 5, further comprising:

sorting the reference departure times of the vehicles parked in the target parking area; and selecting spots near the line-marked parking spaces of parked vehicles whose reference departure times are later than the expected departure time of the user vehicle, and splicing/combining the spots whose usage weights are low as the non-marked parking area.

8. The parking method according to claim 4, further comprising:

receiving the expected departure time of the user vehicle when the target parking area is a parking lot; and determining whether to recommend a line-marked parking space or a non-marked parking space as the parking space based on a comparison result between an estimated stay time and a time threshold, wherein the estimated stay time is calculated as a difference between the expected departure time and a current time.

9. The parking method according to claim 8, further comprising:

in response to the estimated stay time being greater than the threshold time, determining an unoccupied line-marked parking space as the parking space; and in response to the estimated stay time being smaller than or equal to the threshold time, determining a non-marked parking space as the parking space.

10. The parking method according to claim 9, further comprising:

determining the spot near the parking space of the vehicle whose reference departure time is later than the expected departure time as the non-marked parking space, and recommending the non-marked parking space as the parking space to the user vehicle.

11. The parking method according to claim 10, further comprising:

in response to multiple non-marked parking spaces capable of being determined as the non-marked parking space, recommending the non-marked parking space with the lowest usage weight as the parking space.

12. The parking method according to claim 8, further comprising:

in response to insufficient parking spaces in the target parking lot, comparing the expected departure time with reference departure time of each vehicle parked in the target parking area, and recommending the spot near the parking space of the vehicle whose reference departure time is later than the expected departure time as the parking space for the user vehicle.

13. The parking method according to claim 10, further comprising:

when receiving a request from the parked vehicle blocked by the user vehicle, controlling the user vehicle to send a temporary vehicle key to the blocked parked vehicle.

14. The parking method according to claim 13, further comprising:

when an owner of the blocked parked vehicle uses the temporary vehicle key, sending a permission transfer notification to an owner of the user vehicle.

15. The parking method according to claim 4, further comprising:

when the target parking area is an unsupervised parking area, receiving the reference departure time of vehicles parked in the unsupervised parking area, which is sent by terminals of the vehicles parked in the unsupervised parking area; and selecting a spot near a parking space of a vehicle whose reference departure time is later than the expected departure time as the parking space, and sending information related to the parking space to a terminal of the user vehicle.

16. An electronic device, comprising:

a processor storing a computer program; and a memory coupled with the processor;

wherein when being executed by the processor, the computer program causes the processor to:

receive reference departure times of vehicles parked in a target parking area sent by terminals of the vehicles parked in the target parking area;

receive expected departure time sent by a terminal of a user vehicle to be parked in the target parking area;

store in a storage device parking area floor plans of the target parking area, the reference departure times of the vehicles parked in the target parking area, and the expected departure time of the user vehicle;

based on the parking area floor plans stored in the storage device, divide a road access area next to line-marked parking spaces in the target parking area into spots;

calculate a usage weight for each of the spots;

based on the usage weight, determine whether each spot is a non-marked parking space; and compare the expected departure time of the user vehicle to be parked in the target parking area with each of the reference departure times of the vehicles parked in the target parking area, and determine a parking space among the line-marked parking spaces and the non-marked parking spaces in the target parking area for the user vehicle.

* * * * *